(12) United States Patent
Vance

(10) Patent No.: US 9,366,572 B2
(45) Date of Patent: Jun. 14, 2016

(54) ABSORPTION LINE OPTICAL FILTERS AND SPECTROMETERS

(71) Applicant: Joseph Daniel Vance, Scotts Valley, CA (US)

(72) Inventor: Joseph Daniel Vance, Scotts Valley, CA (US)

( * ) Notice: Subject to any disclaimer, the term of this patent is extended or adjusted under 35 U.S.C. 154(b) by 62 days.

(21) Appl. No.: 14/531,902

(22) Filed: Nov. 3, 2014

(65) Prior Publication Data

US 2016/0123807 A1 May 5, 2016

Related U.S. Application Data

(60) Provisional application No. 61/899,245, filed on Nov. 3, 2013.

(51) Int. Cl.
| | |
|---|---|
| *G01J 4/00* | (2006.01) |
| *G01J 3/02* | (2006.01) |
| *G02B 5/22* | (2006.01) |
| *G02B 27/28* | (2006.01) |
| *G02B 5/30* | (2006.01) |
| *G02F 1/01* | (2006.01) |

(52) U.S. Cl.
CPC ............... *G01J 3/0224* (2013.01); *G02B 5/22* (2013.01); *G02B 5/3083* (2013.01); *G02B 27/283* (2013.01); *G02F 1/0126* (2013.01)

(58) Field of Classification Search
CPC .................................. G01J 4/00; G02B 27/283

USPC .......................................................... 356/365
See application file for complete search history.

(56) References Cited

U.S. PATENT DOCUMENTS

| | | | |
|---|---|---|---|
| 7,876,445 B1 | 1/2011 | Vance | |
| 7,884,944 B2 | 2/2011 | Vance | |
| 9,091,590 B2 * | 7/2015 | Vance | .................... G01N 21/31 |
| 2011/0001979 A1 * | 1/2011 | Vance | ....................... G01J 3/42 |
| | | | 356/453 |
| 2013/0208276 A1 | 8/2013 | Vance | |

\* cited by examiner

*Primary Examiner* — Roy M Punnoose

(57) ABSTRACT

An apparatus is disclosed for filtering of probe light and measurement of probe light frequency. The apparatus includes an optical filter comprised of a medium of rapidly changing circular birefringence. The circular birefringent medium changes the polarization of probe light such that light within a certain frequency bandwidth is rotated between crossed polarizers so it will be transmitted through the second polarizer. The spectrometer rotates the polarization of probe light an amount that is dependent upon probe light frequency. Probe light frequency is deduced by analyzing probe light polarization after it propagates through the birefringent medium. The birefringent medium is constructed from a gaseous substance and a magnetic field, where the gaseous substance has one or more absorption lines near the probe light frequency. The magnetic field permeates the gaseous substance and shifts the frequency of the absorption line(s) by the Zeeman effect.

7 Claims, 9 Drawing Sheets

First stage    Second stage

First stage    Second stage first stage transmission spectrum

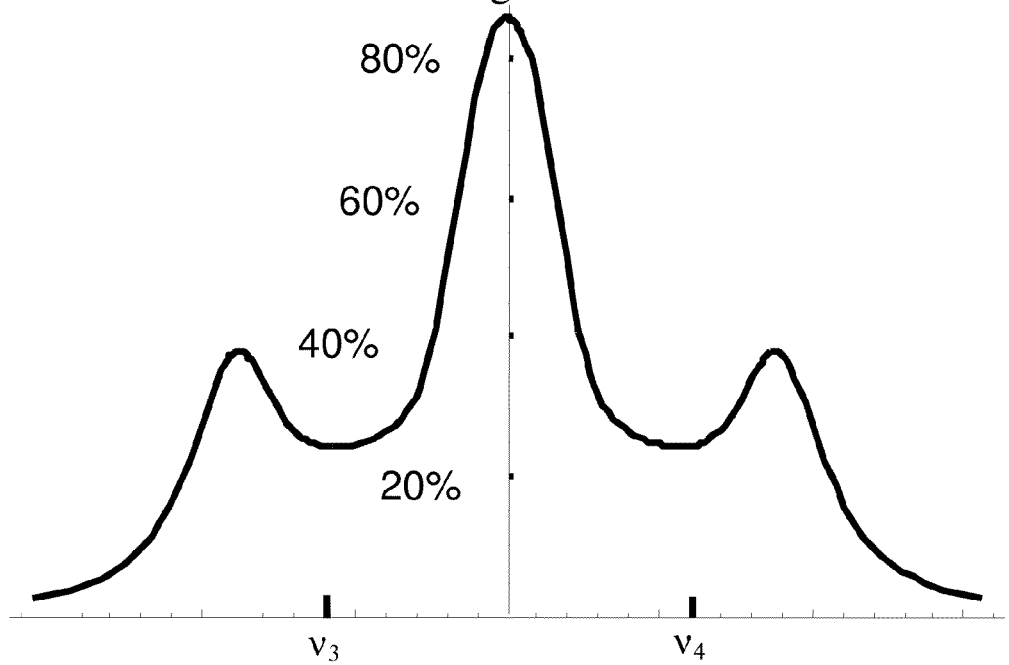

US 9,366,572 B2

ABSORPTION LINE OPTICAL FILTERS AND SPECTROMETERS

FIELD OF THE INVENTION

This invention relates to optical spectrometers and optical filters utilizing circular birefringence to rotate the linear polarization of light. The rotation is used to filter light and deducing the photon wavelength.

BACKGROUND OF THE INVENTION

High resolution measurement of light frequency or wavelength typically makes use of comparing photon wavelength to another object. One method is to compare the wavelength of light to a physical length, such as the cavity length of a Fabry Perot interferometer. Another method is to compare photon wavelength to the wavelength of other photons, called heterodyne detection. A third method is to compare the energy of a photon, which is proportional to frequency, to an absorption line. A new method is introduced here that measures photon wavelength by an absorption line that relies upon dispersion, which accompanies absorption, of an absorption line.

Optical faraday filters are in widespread use, however optical filter pass band and optical spectrometer range of operation must overlap if they are used together. New apparatus of distinguishing frequency and removing background light utilizing filters, spectrometers and combinations of filters and spectrometers are presented. Applications of these inventions are also presented.

BRIEF DESCRIPTION OF THE SEVERAL VIEWS OF THE DRAWING

FIG. 9 shows the hypothetical transmission of the optical filter having a transmission band that may overlap the region of frequency sensitivity of the dual absorption line optical spectrometer.

DETAILED DESCRIPTION OF THE INVENTION

Several drawings illustrate physical the attributes of optical filters, optical spectrometers and combinations of optical spectrometers and optical filters along with quantities that may be manifested with its construction, in accordance with embodiments of the present invention. Examples are described that have particular absorbing substances, mediums, transitions, wavelengths of complimentary light pairs, etc. for purposes of illustration. However, it should be noted that the choices of particular absorbing substance and particular transitions are abundant. Also, while concomitant to the chosen transitions, the wavelengths of the probe light have wide latitude of choice upon a continuum. Thus it is recognized that the apparatus and means described herein may vary without departing from the basic underlying concepts of the invention.

The current invention includes optical spectrometers utilizing dispersion and absorption. An optical spectrometer measures some property of light, typically intensity as a function of wavelength. A dispersion spectrometer utilizes a changing electric susceptibility to demarcate intensity at a particular wavelength. Embodiments of the current invention are based the creation of a medium where in selected frequency regions the dispersion changes and absorption is present.

The current invention also includes optical filters utilizing dispersion and absorption. An optical filter transmits a frequency pass band of light and rejects light outside the pass band. Embodiments of the current invention are based the creation of a medium where in selected frequency regions birefringence is induced by dispersion and absorption.

Atomic Transitions and Absorption

Figure 1:
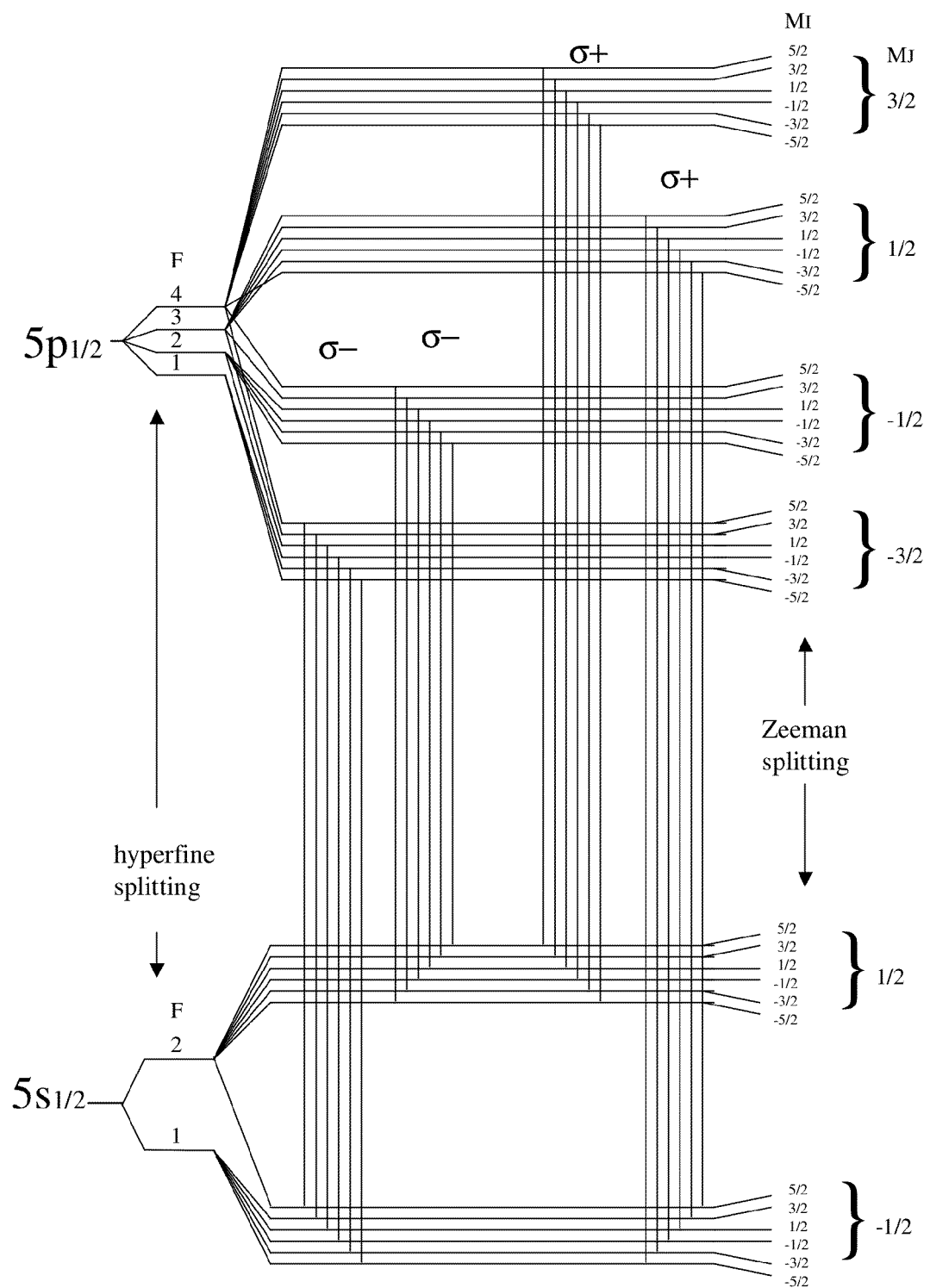
FIG. 1 shows the allowed transitions of rubidium in the with and without the presence of a longitudinal magnetic field.

Consider an atomic transition from a ground state (lowest allowed energy state of an atom) to an excited state. The atom will absorb a photon only if the energy of the photon matches the energy of the transition. An absorption line is a frequency bandwidth of light that can be absorbed by a substance and is associated with a transition from a lower energy state to an upper energy state of the absorbing substance. The frequency width or bandwidth of an absorption line can be defined in terms of unsaturated absorption of the photons: Here, the frequency width of an absorption line is the full width of the line at half the maximum attenuation. When each absorption line absorbs a different frequency bandwidth of light, the absorption lines are distinct. Absorption lines may also be close together to such they meld into one another. The frequency bandwidths may partially overlap, but for absorption lines to remain distinct there will be a frequency region between absorption lines were absorption is less than half the maximum absorption. The ground state is typically thought of and referred to as a single state. However it is not, the ground state can actually be a plurality of states with different quantum numbers and different energies. An example, of an absorbing substance for one embodiment of the present invention is atomic $^{85}$Rb. Rubidium has an absorption line near a wavelength of 780.4 nm. The states of rubidium under the influence of a longitudinal magnetic field is shown in FIG. 1. Also included in the figure on the left is the hyperfine structure of rubidium in the absence of a magnetic field. The transition associated with this absorption line is a rubidium electron in the 5 s state that changes orbit to the 5 p state. The five refers to the principle quantum number of the outer electron and the s and p refer to zero and one unit of electron orbital angular momentum respectively. The 5 s is a ground state, but there is more than one ground state. The 5 s ground state is split by the interaction of the 5 s electron with the nucleus, called the hyperfine structure. The quantum number that associated with the hyperfine structure of the ground state is F, which is the total angular momentum of the entire atom including the nucleus and the electrons. The ground states split into different energy and different total angular momentum: the 5 $s_{1/2}$ F=2 and the 5 $s_{1/2}$ F=1. The ½ refers to the electron total angular momentum (orbital plus spin). The 5 p state also has hyperfine structure but the energy difference between the different states is much lower than for the ground states. When light is of the correct wavelength, having the same energy as the transition energy, there is resonance absorption. Since there is multiple ground states and excited states there will be multiple resonance absorption lines. To distinguish single photon absorption from two-photon absorption, single photon absorption includes transitions from a ground state to an excited state. Single photon absorption excludes transitions from an excited state to another excited state. Two-photon absorption includes a transition from a ground state to an intermediate excited state, and another transition, from an intermediate excited state to a final excited state.

Atomic quantum states also include a magnetic quantum number. The magnetic quantum change, associated with photon absorption and change from a ground state to an excited state, is increased by one unit for right circularly polarized light and is decreased by one unit for left circularly polarized light.

Electric Susceptibility

Resonance absorption also affects light phase, or dispersion. The electric susceptibility is used to describe both the absorption and dispersion effects. The real portion of the electric susceptibility affects light phase while the imaginary portion of the susceptibility quantifies absorption. Whenever the real portion electric susceptibility is different for each circular polarization states of linear polarized light, then the medium becomes circularly birefringent. Linear polarized light will undergo polarization rotation to another linear polarized state while traveling through a circular birefringent medium.

To quantify the birefringence, the electric susceptibility can be used and is defined here in terms of dielectric polarization density:

$$\vec{P} = \epsilon_o \chi \vec{E} \qquad \text{Equation 1}$$

Where the electric susceptibility $\chi$ is the proportionality constant linking the electric field of the probe light to the dielectric polarization, and $\epsilon_o$ is the permittivity of free space. The electric susceptibility $\chi$ is dimensionless and also a complex quantity, and is expressed in component form as:

$$\chi = \chi' + i\chi'' \qquad \text{Equation 2}$$

Using a circular polarization basis to express linear light, with some minor approximations and removing time dependence, the electric field of light after traveling a distance l within a circularly birefringent medium is:

$$\vec{E}(l) = -\frac{E_o}{\sqrt{2}}\exp\left[i\left\{\frac{\omega}{c}\left(1 + \frac{\chi'_+}{2} + i\frac{\chi''_+}{2}\right)l\right\}\right]\hat{+} + \frac{E_o}{\sqrt{2}}\exp\left[i\left\{\frac{\omega}{c}\left(1 + \frac{\chi'_-}{2} + i\frac{\chi''_-}{2}\right)l\right\}\right]\hat{-} \qquad \text{Equation 3}$$

Where $\omega$ is the angular frequency and c is the speed of light. Equation 3 demonstrates that $\chi'$, the real portion of the electric susceptibility, affects phase, while $\chi''$, the imaginary portion of the electric susceptibility, is related to absorption. The subscripts, plus and minus, attached to the susceptibilities identifies to which circular polarization state the electric susceptibility applies to: right and left handed polarization, respectively. Notice that the field vector is written in a circular polarization basis.

Figure 2A:
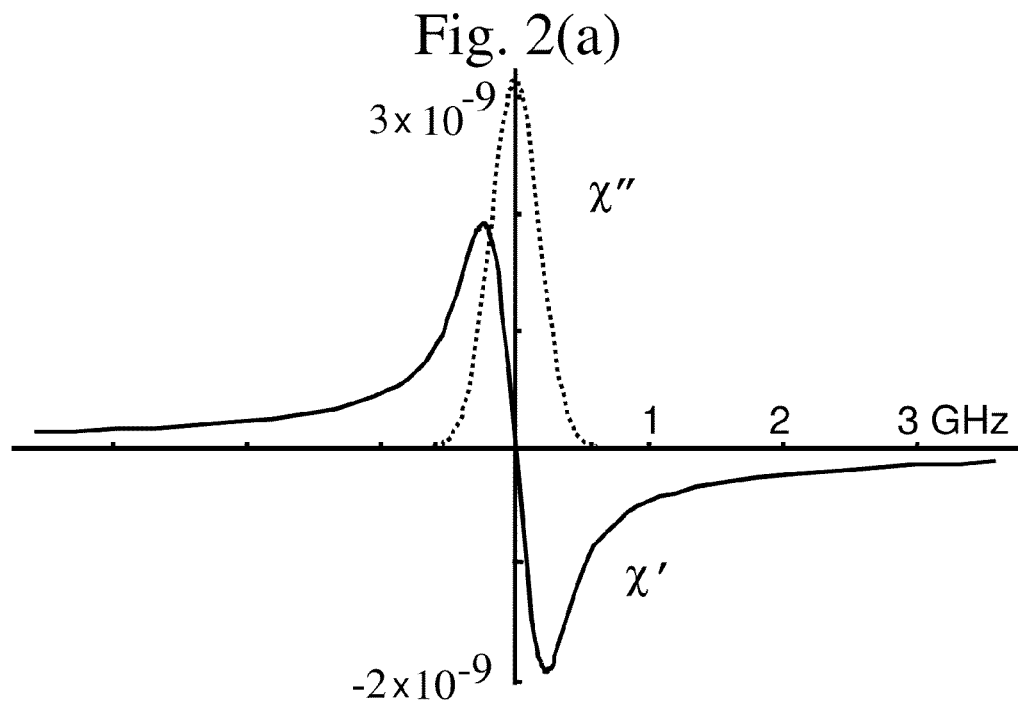
FIG. 2(a) shows a theoretical example the real ($\chi'$) and imaginary ($\chi''$) portions of the electric susceptibility near an absorption line.

The susceptibility is an analytic function. This has implications to the relationship of the real and imaginary portions of the susceptibility. The real and imaginary portions of the susceptibility are inexorably linked. In fact, if one is known then the other can be derived from it. Thus absorption can't be suppressed without also suppressing dispersion. FIG. 2(a) is a hypothetical example of the real and imaginary susceptibility from an absorption line. The region where the real portion of susceptibility changes most rapidly with frequency is also the region where absorption occurs. Absorption may destroy the linear polarization property of the light, so absorption may need to be moderated.

Zeeman Effect Induced Birefringence

Here, circular birefringence may be made manifest by a magnetic field. A magnetic field may split and displace the transition energy of some substances, known as Zeeman splitting. A magnetic field is referred to as a longitudinal magnetic field when its direction is predominately the same or opposite relative to the propagation direction of some particular light source. Since the magnetic field is a vector, it has both magnitude and direction. Thus what it means for two magnetic fields to be the same depends on its magnitude and direction. Two magnetic fields are the same when both magnitude and direction are the same. When either magnitude or direction of one magnetic field is different than another the magnetic fields are different. For example, two longitudinal magnetic fields are different when their magnitude is the same, but they point in opposite directions. When one longitudinal magnetic field is different than another, it may also mean that the fields point in the same direction but have a different magnitude. A magnetic field that permeates some substances will shift up or down the energy level of the energy states of the substance. This is demonstrated in FIG. 1 where the magnetic field is longitudinal relative to light that may be absorbed. This will cause a shift upward in the frequency of resonance for one circular polarization component of light, and shift downward the frequency of resonance for the other (opposite) circular polarization component of light. The magnetic field induces a difference in the real portion of the susceptibility for each circular polarization component of the light, making the medium circularly birefringent.

Figure 2B:
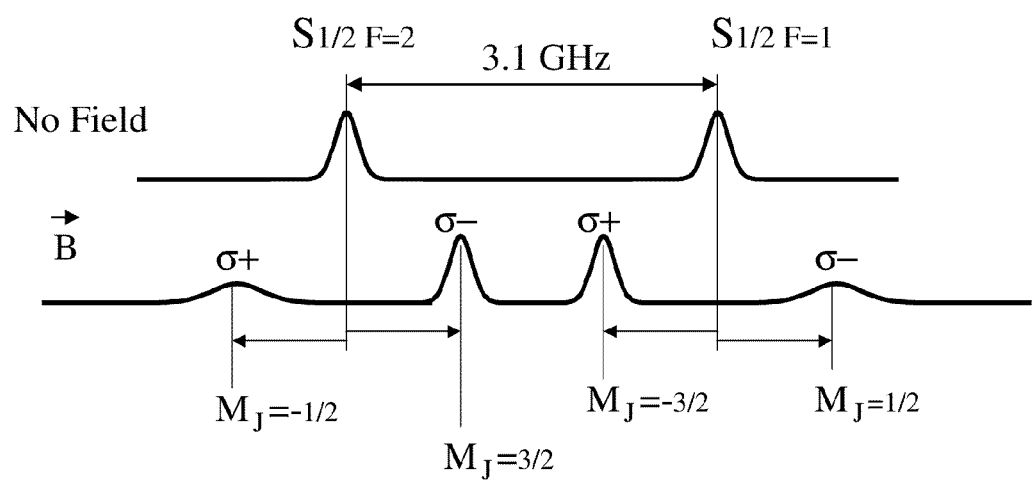
FIG. 2(b) shows the shifting of absorption lines of $^{85}$Rb induced by the application of a longitudinal magnetic field.

Notice in FIG. 1 that while the magnetic quantum states are no longer degenerate, the transition energy may be nearly degenerate for some transitions. There two sets of transitions where the transition energy appears the same ($M_f$=3/2, −3/2) and two sets where the transition energy appears to differ ($M_J$=1/2, −1/2). Spectrally, because some of the lines are not degenerate, there will be two relatively sharp absorption lines and two relatively broad absorption lines. FIG. 2(b) shows hypothetical unsaturated absorption cross section spectrum of the rubidium 85 $D_2$ line with no field (top) and when under the influence of a longitudinal magnetic field (bottom). Two of the lines will absorb only left polarized light and two lines will absorb only right polarized light in accordance with quantum mechanical selection rules. Besides beam attenuation, resonance absorption can be identified by fluorescence spectroscopy. With fluorescence spectroscopy a detector is placed outside of the beam path. Then after a photon is absorbed, re-emission can occur in any direction and some photons may enter a detector. More absorption leads to more re-emission into the detector. So in fluorescence spectroscopy, resonance absorption does not appear as a frequency region of diminished photons, instead absorption appears as a source of photons. Note that the cross section shown FIG. 2(b) may instead be interpreted intuitively (not quantitatively) as the hypothetical imaginary portion of susceptibility, or fluorescence spectroscopy.

The allowed transitions of FIG. 1 shows are specific for a longitudinal magnetic field. For magnetic fields that are not longitudinal relative to the propagation direction of a photon beam, other transitions are allowed. Upon emission of a photon, an excited state can emit light in any direction, so the magnetic field may no longer be longitudinal relative the emitted photon. The emitted photons may have allowed transitions that are different than possibilities shown in the FIG. 1. Optical pumping may occur where the substance may absorb light, and then upon emission revert to a ground state that may not allow re-absorption from light identical (or nearly identical) to light of the previous absorption. For instance, a photon of correct frequency may be absorbed by a rubidium atom in the 5 $s_{1/2}$ F=1 state and transition to the 5 p state. Then the atom may decay from the 5 p state into the 5 $s_{1/2}$ F=2 state. Since the atom is now in a different ground state than it was formerly in, it will not absorb light at the same frequency bandwidth as before. That atom has been optically pumped from one ground state to another. This effect will be exploited to improve the qualities of the optical filter and optical spectrometer by enhancing absorption, and associated birefringence, for particular transitions and suppressing absorption and its effects for other particular transitions. While four absorption lines are present for $D_2$ transitions in the presence of a magnetic field, for some embodiments of the current invention only one of the four absorption lines is utilized in a particular cell. The lines not utilized may sometimes be ignored, or they may not be in a location that causes a problem. If a particular line is interfering with operation, its effects can be mitigated by the use of optical pumping. When optical pumping is employed, A line that is present that is desired to be eliminated may have its impact reduced by tuning a light source to that line. Notice that there are two lines for each of the two ground states for $D_2$ transitions in the presence of a longitudinal magnetic field. By tuning a light source to resonance with a particular line, the number of atoms in a particular ground state will reduced, and the cross section for two of the lines will likewise be reduced.

Some of the examples that follow use rubidium or cesium vapor as an absorbing substance that is subjected to a longitudinal magnetic field. The absorbing substance is not restricted to atomic vapors. The Zeeman effect also applies to paramagnetic molecules such as oxygen ($O_2$) and similarly they may also become birefringent and may be used as an absorbing substance.

High Resolution Absorption Line Optical Filter

Faraday optical filters utilizing alkali metals in atomic form are in widespread use. Here, an optical filter is presented having a narrower pass band and higher resolution than known Faraday filters. The high resolution optical filter may also be used as an optical filter and spectrometer combination.

Atomic Faraday filters known to the prior art utilize two absorption lines operating together in concert to create a main center transmission peak and two smaller transmission peaks on either side of the main transmission peak. The strength of the magnetic field controls the proximity of the absorption lines to each other which can be infered from FIG. 2(b). Filters can also be created when the absorption lines are not in close proximity to each other. But they have drawbacks which will be addressed below.

In the case of an absorption line under the influence of a longitudinal magnetic field, such that each of the absorption lines are not in close proximity in frequency, then each absorption line induces birefringence like that shown in FIG. 2(a) and the influence from other absorption lines is not considered. This is exploited to build the high resolution absorption line optical filter.

Figure 3A:
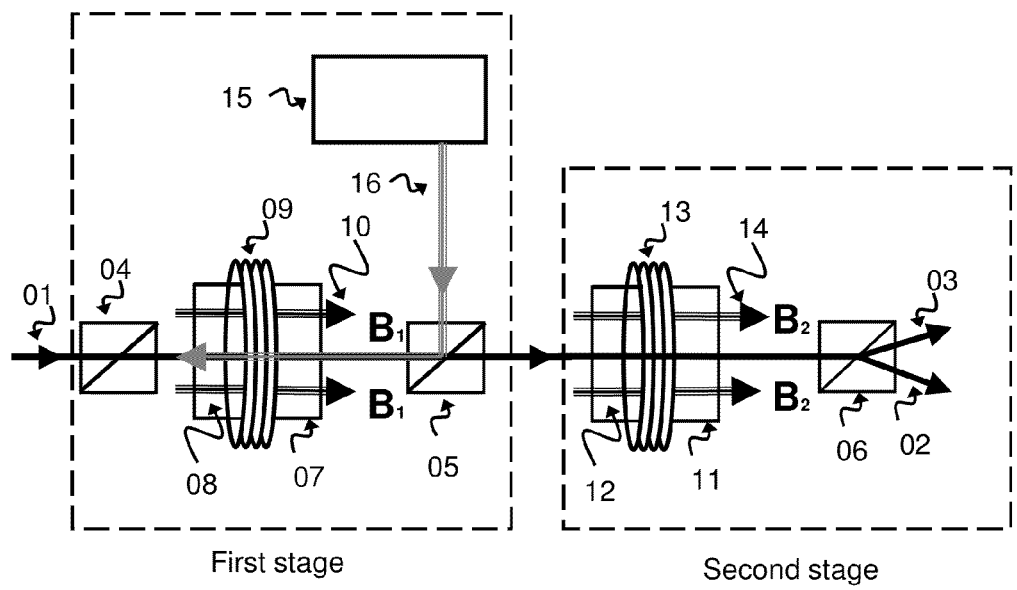
FIG. 3(a) is a schematic diagram of the major elements of a high resolution dispersion optical filter in accordance with one embodiment of the current invention.
Figure 3B:
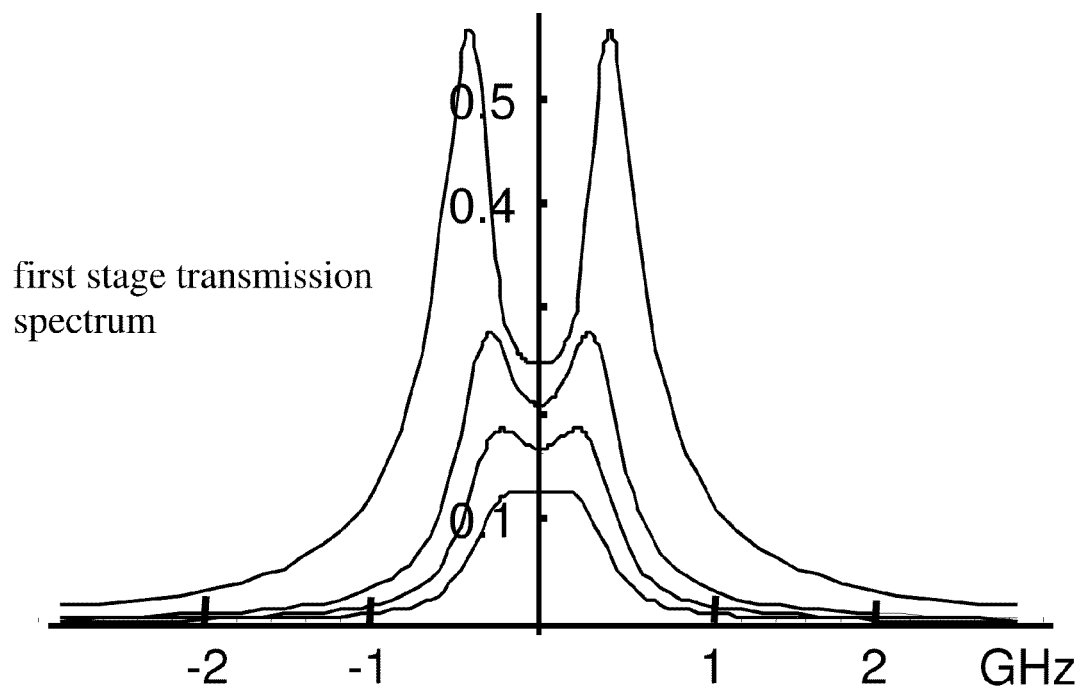
FIG. 3(b) shows the transmission spectra of the first stage of the high resolution dispersion optical filter for several hypothetical susceptibility strengths.

The elements that may comprise the high resolution absorption line optical filter are shown in FIG. 3(a) in accordance with one embodiment of the current invention. The probe light 01 may propagate through a first polarizer 04 and then may enter into a first cell 07 that may contain an absorbing substance 08. An example of absorbing substance is $^{85}$Rb. Some of the rubidium may be in an atomic vapor state. The rubidium will have absorption lines near 780.24 nm. A longitudinal magnetic field 10 of strength $B_1$ provided by magnet 09 may permeate the absorbing substance 08. The absorbing substance 08 and longitudinal magnetic field 10 combine to create birefringent medium for the probe light 01. The probe light 01 may next propagate through a second polarizer 05 with a transmission axis oriented orthogonal relative to the transmission axis of the first polarizer 04. Note that orientation of the transmission axis of the second polarizer 05 relative to the transmission axis the first polarizer 04 is an angle along a continuum of possible angle orientations. Since orthogonal orientation angle is a single point, and a single point is without width, a tolerance must be introduced. The definition of orthogonal orientation is expanded to include all orientations that are approximately orthogonal in orientation. The pass band transmission through the polarizer may have a spectrum that looks like that of FIG. 3(b). FIG. 3(b) shows several hypothetical pass bands of different susceptibility and cell length combinations, where increasing susceptibility and cell length is associated with increasing transmission. Theoretically, the transmission through the first stage can be calculated using equation 3. The following formula was used to create the spectrum shown in FIG. 3(b).

$$T = \frac{|\vec{E} \cdot \hat{y}|^2}{E_o^2} \qquad \text{Equation 4}$$

$$T = \frac{1}{4}\left[ \begin{array}{c} \exp\left(-\frac{\omega}{c}\chi''_+ l\right) + \exp\left(-\frac{\omega}{c}\chi''_- l\right) - \\ 2\exp\left(-\frac{\omega}{c}\frac{\chi''_+ + \chi''_-}{2}l\right)\cos\left(\frac{\omega}{c}\frac{\chi''_+ + \chi''_-}{2}l\right) \end{array} \right]$$

Figure 4A:
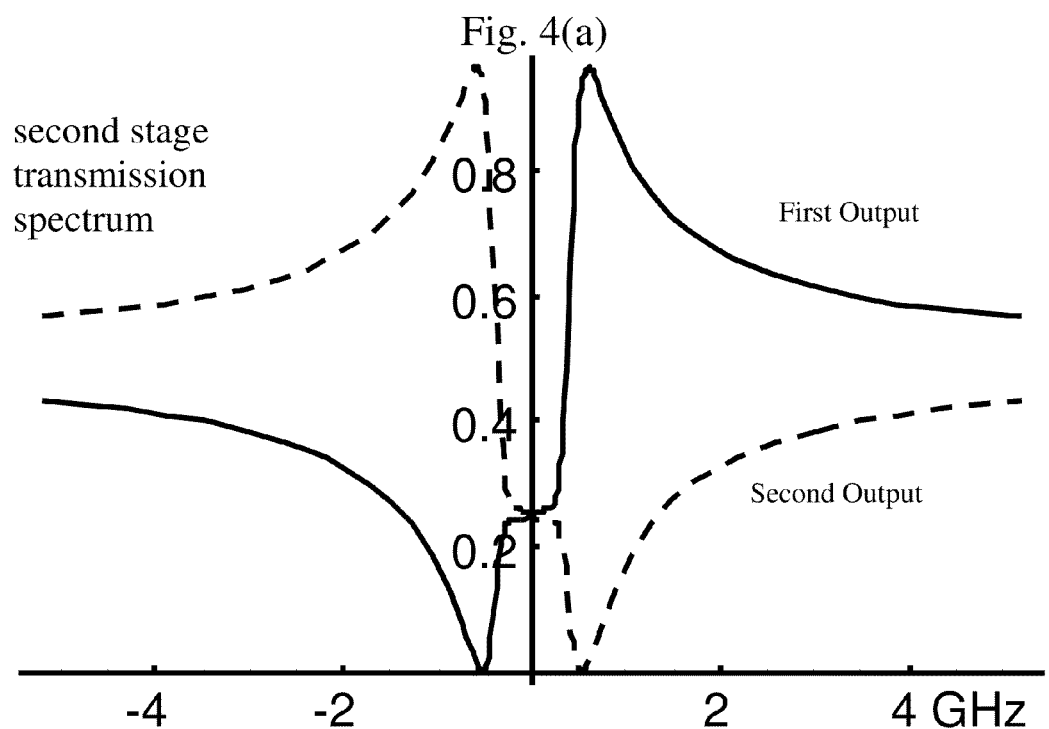
FIG. 4(a) shows the transmission spectra of the second stage of the high resolution dispersion optical filter for a hypothetical susceptibility.
Figure 4B:
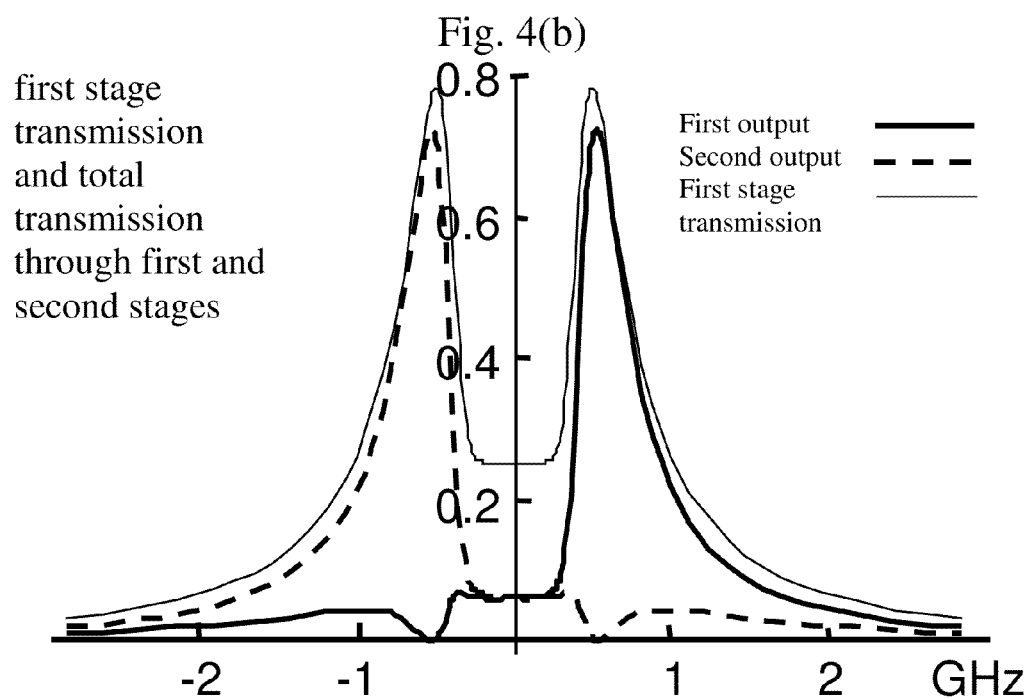
FIG. 4(b) shows the total hypothetical transmission into two channels through the high resolution dispersion optical filter.

After passing through the first stage of the high resolution absorption line optical filter, the probe light 01 may enter the second stage of the high resolution absorption line optical filter. The probe light may enter cell 11 that may contain an absorbing substance 12. An example of an absorbing substance 12 is $^{85}$Rb. A magnetic field 14 of strength $B_2$ provided by magnet 13 may permeate absorbing substance 12. The magnetic field 14 and the absorbing substance combine to create a birefringent medium for the probe light 01. The strength $B_2$ of the magnetic field 14 may be approximately equal to the strength $B_1$ of magnetic field 10 which makes the absorption lines coincident. The probe light 01 may next enter into polarizing beam splitter 06 which may be oriented 45 degrees relative to the probe light polarization before it enters cell 11. An example of a polarizing beam splitter 06 is a Wollaston prism. The polarizing beam splitter 06 splits the probe light 01 into two separate beams of orthogonal polarization, a first output 02 and second output 03. Now since there is two outputs, light at a frequency within the first output 02 bandwidth is distinguishable from light within the second output 03 bandwidth. FIG. 4(*a*) shows the hypothetical transmission spectrum through the second stage of the high resolution absorption line optical filter. FIG. 4(*b*) shows the product of the first stage transmission and the second stage transmission, representing the total transmission through the high resolution absorption line optical filter. Also plotted is the first stage of the high resolution absorption line optical filter only.

Theoretically, transmission of the second stage into the first output and second output can be calculated by the dot product of the field to the polarizing beam splitter at 45 degrees using equation 3:

$$T = \frac{\left|\vec{E} \cdot \left(\frac{\hat{x} \pm \hat{y}}{\sqrt{2}}\right)\right|^2}{E_o^2} \quad \text{Equation 5}$$

$$T = \frac{1}{4}\left[\begin{array}{c}\exp\left(-\frac{\omega}{c}\chi_+'' l\right) + \exp\left(-\frac{\omega}{c}\chi_-'' l\right) \pm \\ 2\exp\left(-\frac{\omega}{c}\frac{\chi_+'' + \chi_-''}{2}l\right)\sin\left(\frac{\omega}{c}\frac{\chi_+'' + \chi_-''}{2}l\right)\end{array}\right]$$

The frequency distribution of probe light 01 having a broad frequency bandwidth may be determined by the relative magnitude (ratio) of the first output 01 to the second output 02. Therefore the high resolution absorption line optical filter may also be utilized as a combination of optical filter and optical spectrometer.

A laser 15 may be utilized in the high resolution absorption line optical filter. Since there are multiple absorption lines, there will be multiple transmission spectrums associated with each line. A laser 15 emanating pump light 16 may propagate through the absorbing substance 08. The pump light 16 may be in resonance with one absorption line. When the pump light 16 is in resonance with one absorption line, then the light will pump the absorbing substance in one ground state to another ground state. The optical pumping will suppress the susceptibility of one line and increase the susceptibility of another line. In that way, transmission through the high resolution absorption line optical filter from one absorption line is increased. Also important, is that the transmission through the high resolution absorption line optical filter from an adjacent absorption line is suppressed.

Dual Absorption Line Optical Spectrometer

The second stage of the high resolution absorption line optical filter partitions each lobe of the first stage of the transmission spectrum into different channels. The attenuation of the probe light signal in the center of the spectrum is a great disadvantage of the second stage. A way to distinguish light using dispersion without absorption would be of great value. One way to do that is to have two absorption lines in close proximity. But complimentary polarization absorption such as utilized in Faraday filters is not useful to produce a spectrometer. What can be exploited to produce a spectrometer is two absorption lines in close frequency proximity, both of which absorb the same circular polarization of light. So two absorption lines are needed such that both lines absorb left polarized or both lines absorb right circularly polarized light. The way to produce two lines in close proximity of which both lines absorb only one circular component of light is to use two cells containing an absorbing substance, each with a longitudinal magnetic field, but with a magnetic field strength different in each cell.

Figure 5:
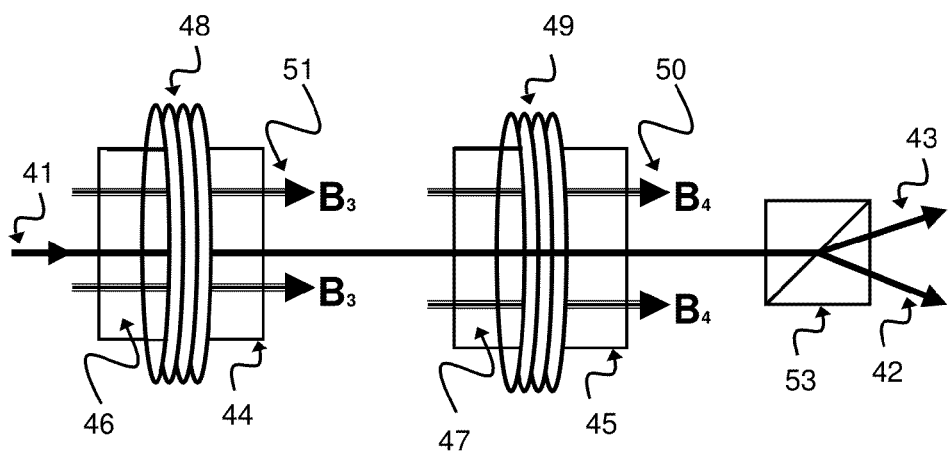
FIG. 5 is a schematic diagram of the major elements of the high resolution absorption line optical filter.
Figure 6:
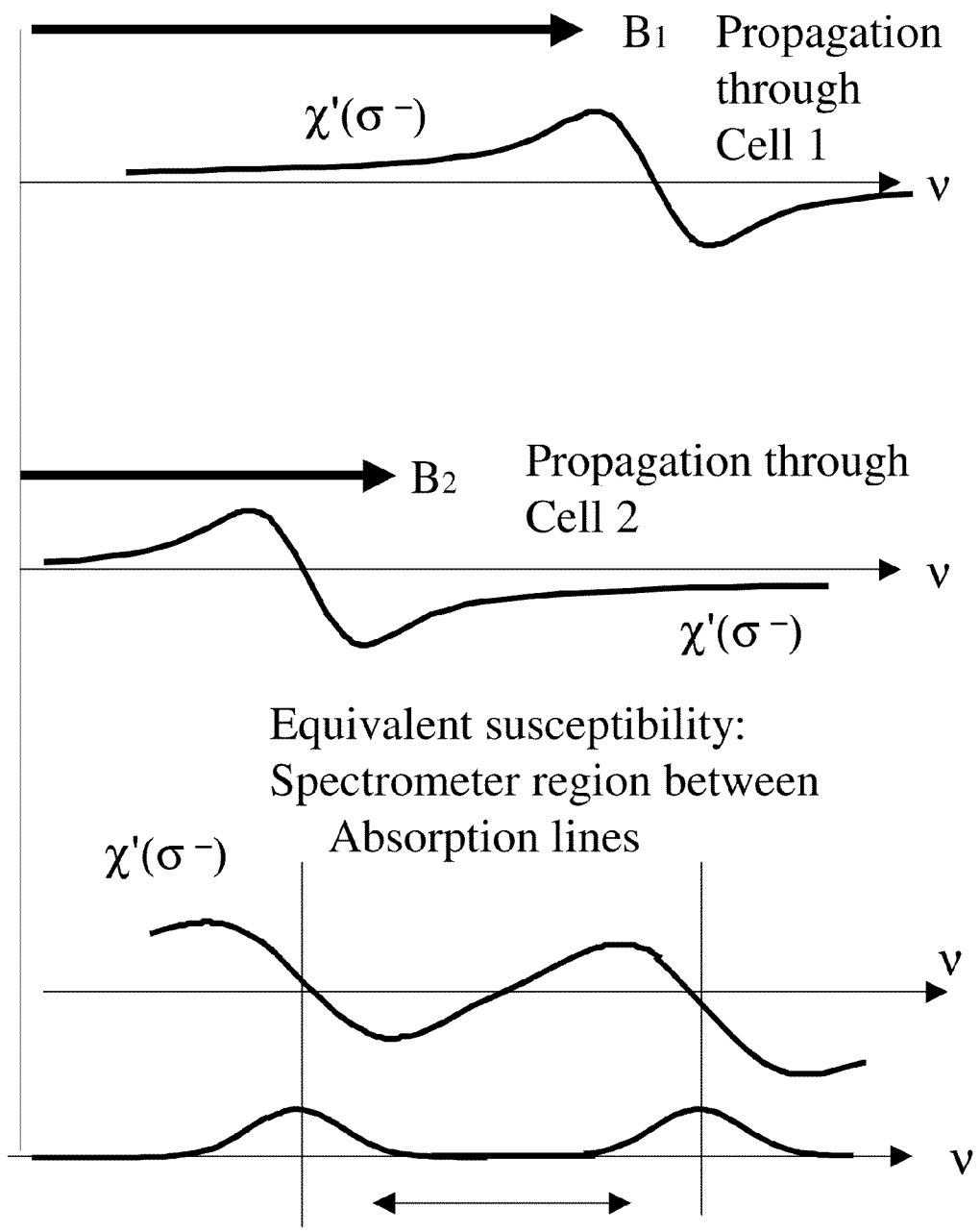
FIG. 6 shows hypothetical susceptibility for two birefringent mediums, and equivalent susceptibility when they are combined to form the dual absorption line optical spectrometer.
Figure 7A:
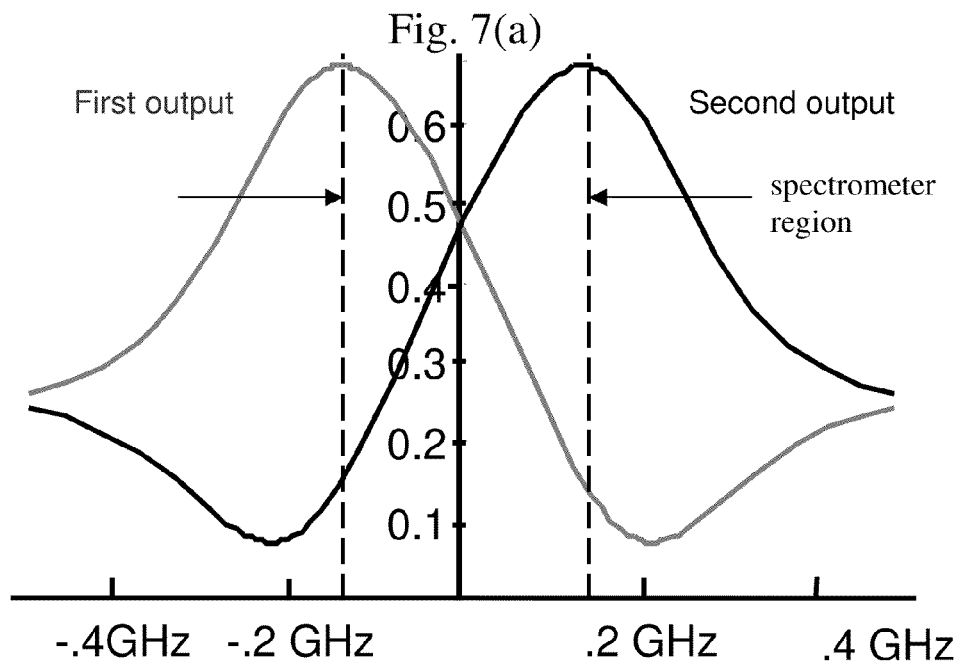
FIG. 7(a) shows the hypothetical output of the dual absorption line optical spectrometer.
Figure 7B:
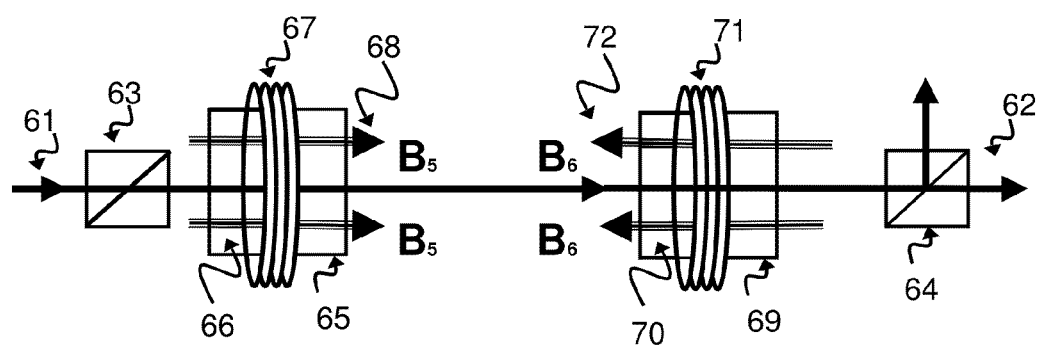
FIG. 7(b) is a schematic diagram of the major elements of the optical filter having a transmission band that may overlap the region of frequency sensitivity of the dual absorption line optical spectrometer.

FIG. 5 shows the elements that may comprise the dual absorption line optical spectrometer in accordance with one embodiment of the current invention. The probe light 41 may be transmitted through a first cell 44 that may contain a first absorbing substance 46. An example of a first absorbing substance 46 is cesium. Among several absorption lines of cesium is two lines both near 852 nm. A third magnetic field 51 of magnitude $B_3$ emanating from magnet 48 may permeate the first absorbing substance 46 in a longitudinal direction relative to the probe light 41. The first absorbing substance 46 and the first magnetic field 51 combine to form a first birefringent medium for the probe light 41. The probe light 41 then undergoes a polarization rotation an amount that is dependent upon probe light 41 frequency. Next the probe light 41 may be transmitted through a second cell 45 that may contain a second absorbing substance 47. An example of a second absorbing substance 47 is cesium. A fourth magnetic field 50 of magnitude $B_4$ emanating from magnet 49 may permeate the second absorbing substance 47 in a longitudinal direction relative to the probe light 41. The second absorbing substance 47 and the fourth magnetic field 50 combine to form a second birefringent medium for the probe light 41. The probe light 41 then undergoes a polarization rotation an amount that is dependent upon probe 41 light frequency. Susceptibility associated with the first birefringent medium and the second birefringent medium is shown in FIG. 6. The probe light 41 then may propagate through a polarizing beam splitter 53. An example of a polarizing beam splitter 53 is a Wollaston prism. The orientation of the polarizing beam splitter 53 relative to the initial polarization of the probe light 41 may be 45 degrees, but may vary. The polarizing beam splitter 53 splits the probe light 41 into two separate beams, a first output light 42 and second output light 43 that have polarization that is mutually orthogonal. The relative magnitude of the first output light 42 to the second output light 43 is used to determine frequency. Another way to produce the above spectrometer is to remove the second cell 45 containing the second absorbing substance 47 and alternate the magnitude of the magnetic field 51 between two values $B_3$ and $B_4$ that permeates the first absorbing substance 46. Then the first output 42 during the time magnetic field is of magnitude $B_3$ is added to first output 42 during the time magnetic field is of magnitude $B_4$. Likewise second output 43 during the time magnetic field is of magnitude $B_3$ is added to second output 43 during the time magnetic field is of magnitude $B_4$. Then frequency of probe light 41 can be determined from the ratio of the first output 42 and second output 43 sums. The one cell with alternating magnetic field embodiment of the spectrometer is equivalent but inferior two cell embodiment as about half the resolution is lost. At any particular instant of time, the probe light is transmitted through a medium where only one particular magnetic field magnitude is present. But to operate the spectrometer, the signal is averaged over time. The probe light 41 is subjected to two distinct birefringent mediums sequentially in time instead of in space. Thus it is understood that when it is stated that the probe light propagates 41 through a first birefringent medium and the probe light 41 propagates through a second birefringent medium, it may mean the probe light 41 propagates through two different birefringent mediums sequentially in space, or sequentially in time. The transmission output of the spectrometer is shown in FIG. 7(*a*), where frequency is determined by the relative strengths of the first output 42 to the second output 43.

Optical Filter with Transmission Band Matched to Spectrometer

Figure 8:
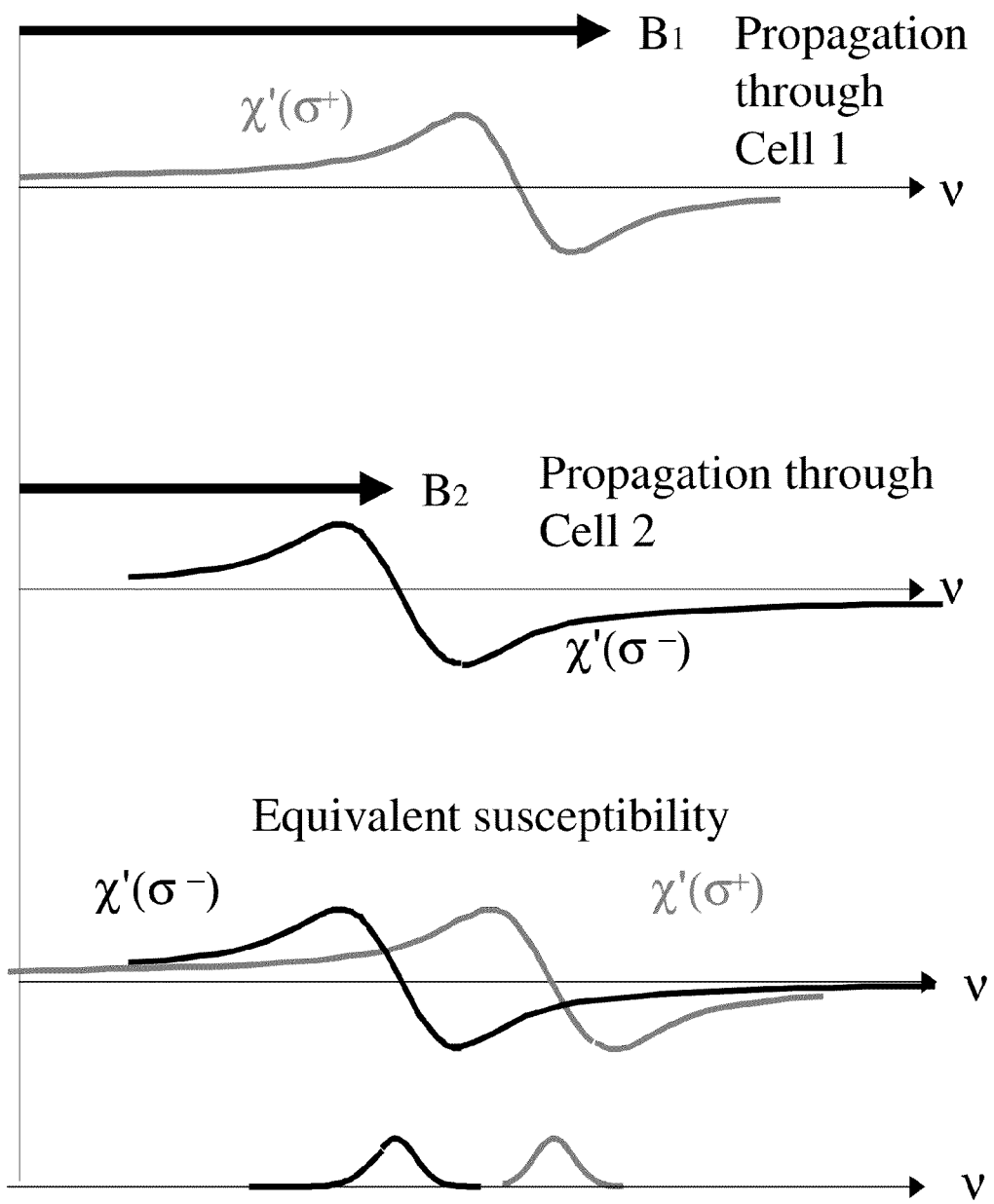
FIG. 8. shows the hypothetical susceptibility of two birefringent mediums, and equivalent susceptibility when they are combined, to form an optical filter having a transmission band that may overlap the region of frequency sensitivity of the dual absorption line optical spectrometer.

An optical filter with a transmission pass band that coincides with the frequency of operation of the optical spectrometer embodiment described above would be of great value. But Faraday filters known to the prior art transmit light in different frequency regions than the spectrometer described above. An optical filter with a pass band to match up with the spectrometer can be built when the magnetic fields of two cells oppose each other. FIG. 7(*b*) shows the elements of an optical filter that has a pass band that may correspond to the frequency sensitivity region of the spectrometer shown in FIG. 5 in accordance with one embodiment of the current invention. The probe light 61 may propagate through a polarizer 61. Next the probe light 61 may propagate through a first cell 65 that contains a first absorbing substance 66. An example of a first absorbing substance 66 is cesium which has absorption lines near 852 nm. A fifth magnetic field 68, produced by a fifth magnet 67, may permeate the first absorbing substance 66. The first absorbing substance 66 and the fifth magnetic field 68 combine to make a first birefringent medium for the probe light 61. The polarization of the probe light 61 may be rotated while propagating through the first birefringent medium. Next the probe light 61 may propagate through a second cell 69 that contains a second absorbing substance 70. An example of a second absorbing substance 70 is cesium which has absorption lines near 852 nm. A sixth magnetic field 72, produced by a sixth magnet 71, may permeate the second absorbing substance 70. The second absorbing substance 70 and the sixth magnetic field 72 combine to make a second birefringent medium for the probe light 61. The polarization of the probe light 61 may be rotated while propagating through the second birefringent medium. Susceptibility associated with the first birefringent medium and second birefringent medium is shown in FIG. 8. The direction of the fifth magnetic field 68 may be opposite to the direction of the sixth magnetic field 72. Next the probe light 61 encounters a second polarizer 64 where some of the probe light 61 may be transmitted through the second polarizer 64 and some of the probe light 61 may be rejected by the second polarizer 64. The transmitted polarization orientation of the second polarizer 64 relative to transmitted polarization orientation the first polarizer 63 may be orthogonal. The transmission through the optical filter described above may have a transmission spectrum similar to that shown in FIG. 9.

What is claimed is:

1. An optical filter acting upon probe light, comprising:
   (a) a first absorbing substance with one or more absorption lines;
   (b) a second absorbing substance with one or more absorption lines;
   (c) a first longitudinal magnetic field permeating the first absorbing substance;
   (d) a second longitudinal magnetic field permeating the second absorbing substance;
   (e) a first polarizer;
   (f) a second polarizer;
   (g) a polarizing beam splitter;
   wherein the first absorbing substance and the first longitudinal magnetic field combine to form a first birefringent medium for the probe light;
   wherein the second absorbing substance and the second longitudinal magnetic field combine to form a second birefringent medium for the probe light;
   wherein the second polarizer transmission axis is oriented approximately orthogonal relative to the first polarizer transmission axis;
   wherein the probe light is directed into the first polarizer and some of the probe light is transmitted through the first polarizer and,
   then the probe light propagates through the first birefringent medium and, then is directed into the second polarizer;
   wherein the polarization of some of the probe light having a frequency within a transmission bandwidth is rotated by the first birefringent medium and transmitted through the second polarizer;
   wherein the probe light that was transmitted through the second polarizer then propagates through the second birefringent medium and then is directed into the polarizing beam splitter;
   wherein the second birefringent medium changes the polarization of the probe light an amount that is dependent upon probe light frequency;
   wherein the polarizing beam splitter splits the probe light into a first linear polarization component and a second linear polarization component.

2. The optical filter of claim 1:
   wherein probe light frequency is determined from the relative magnitude of the first linear polarization component to the second linear polarization component.

3. The optical filter of claim 1 and further comprising:
   a pump light having a frequency in resonance with an absorption line of the first absorbing substance;
   wherein the pump light is propagated through the first absorbing substance;
   wherein by the process of optical pumping, the pump light depletes the amount of first absorbing substance in a first ground state and increases the amount of first absorbing substance in a second ground state.

4. An optical spectrometer acting upon probe light comprising:
   (a) a first absorbing substance with one or more absorption lines;
   (b) a second absorbing substance with one or more absorption lines;
   (c) a first longitudinal magnetic field permeating the first absorbing substance;
   (d) a second longitudinal magnetic field permeating the second absorbing substance;
   (e) a polarizing beam splitter;
   wherein the first absorbing substance absorbs probe light by the process of single photon absorption;
   wherein the second absorbing substance absorbs probe light by the process of single photon absorption;
   wherein the first magnetic field is different than the second magnetic field;
   wherein the first absorbing substance and the first longitudinal magnetic field combine to form a first birefringent medium for the probe light;

wherein the second absorbing substance and the second longitudinal magnetic field combine to form a second birefringent medium for the probe light;

wherein the probe light propagates through the first birefringent medium and then propagates through the second birefringent medium and then is directed into the polarizing beam splitter;

wherein the polarization of the probe light is rotated by the first birefringent medium an amount that is dependent upon probe light frequency;

wherein the polarization of the probe light is rotated by the second birefringent medium an amount that is dependent upon probe light frequency;

wherein the polarizing beam splitter splits the probe light into a first polarization component and a second polarization component;

wherein frequency of the probe light is determined from the relative magnitude of the first polarization component to the second polarization component.

5. The optical spectrometer of claim 4 and further comprising:
   a first pump light having a frequency in resonance with an absorption line of the first absorbing substance;
   wherein the first pump light is propagated through the first absorbing substance;
   wherein by the process of optical pumping, the pump light depletes the amount of first absorbing substance in a first ground state and increases the amount of first absorbing substance in a second ground state.

6. The optical spectrometer of claim 5 and further comprising:
   a second pump light having a frequency in resonance with an absorption line of the second absorbing substance;
   wherein the second pump light is propagated through the second absorbing substance;
   wherein by the process of optical pumping, the pump light depletes the amount of second absorbing substance in a third ground state and increases the amount of second absorbing substance in a fourth ground state.

7. The optical spectrometer of claim 4 and further comprising:
   an optical filter;
   wherein the optical filter is comprised of:
   (a) a third absorbing substance with one or more absorption lines;
   (b) a fourth absorbing substance with one or more absorption lines;
   (c) a third longitudinal magnetic field permeating the third absorbing substance;
   (d) a fourth longitudinal magnetic field permeating the fourth absorbing substance;
   (e) a first polarizer;
   (f) a second polarizer;
   wherein the third absorbing substance and the third longitudinal magnetic field combine to form a third birefringent medium for the probe light;
   wherein the fourth absorbing substance and the fourth longitudinal magnetic field combine to form a fourth birefringent medium for the probe light;
   wherein the third magnetic field is different than the fourth magnetic field;
   wherein the second polarizer transmission axis is oriented approximately orthogonal relative to the first polarizer transmission axis;
   wherein before the probe light is directed into the spectrometer of claim 4, the probe light is directed into the first polarizer and some of the probe light is transmitted through the first polarizer and,
   then the probe light propagates through the third birefringent medium and,
   then the probe light propagates through the fourth birefringent medium and,
   then is directed into the second polarizer;
   wherein the polarization of some of the probe light having a frequency within a transmission bandwidth is rotated by the third birefringent medium and;
   wherein the polarization of some of the probe light having a frequency within a transmission bandwidth is rotated by the fourth birefringent medium and;
   then some of the probe light is then transmitted through the second polarizer;
   wherein the probe light that was transmitted through the second polarizer is then directed into the spectrometer of claim 4.

* * * * *